United States Patent
Zulim et al.

(10) Patent No.: US 11,469,660 B2
(45) Date of Patent: Oct. 11, 2022

(54) INRUSH CURRENT LIMITING POWER SUPPLY

(71) Applicant: ABL IP Holding LLC, Atlanta, GA (US)

(72) Inventors: Dalibor Zulim, Conyers, GA (US); Richard Lee Westrick, Jr., Social Circle, GA (US); Frank van Horck, Eindhoven (NL)

(73) Assignee: ABL IP HOLDING LLC, Atlanta, GA (US)

( * ) Notice: Subject to any disclaimer, the term of this patent is extended or adjusted under 35 U.S.C. 154(b) by 77 days.

(21) Appl. No.: 16/990,045

(22) Filed: Aug. 11, 2020

(65) Prior Publication Data

US 2021/0050771 A1    Feb. 18, 2021

Related U.S. Application Data

(60) Provisional application No. 62/885,408, filed on Aug. 12, 2019.

(51) Int. Cl.
*H02M 1/32* (2007.01)
*H02M 1/36* (2007.01)
(Continued)

(52) U.S. Cl.
CPC .............. *H02M 1/32* (2013.01); *H02H 3/338* (2013.01); *H02M 1/325* (2021.05)

(58) Field of Classification Search
CPC .......... H02M 1/32; H02M 1/325; H02M 1/36; H02M 1/06; H02M 7/062; H02M 7/125
See application file for complete search history.

(56) References Cited

U.S. PATENT DOCUMENTS 4,731,548 A * 3/1988 Ingraham ............. H03K 17/962
307/116
4,874,962 A   10/1989 Hermans
(Continued)

FOREIGN PATENT DOCUMENTS

CN       104428985 B * 9/2018 ............ H02M 3/157
EP       1811642 A2 * 7/2007
(Continued)

OTHER PUBLICATIONS

"Reference Design Kit for a Low Standby Current Non-Isolated Flyback Power Supply Using LinkSwitch™-TN2LNK3202D", Power Integration, Reference Design RDR-623, May 24, 2018, 48 pages.

*Primary Examiner* — Sisay G Tiku
(74) *Attorney, Agent, or Firm* — Kilpatrick Townsend & Stockton LLP

(57) ABSTRACT

A system for providing power from an AC power supply to an external load. The system includes a current limiter circuit, connected to an input of a switched-mode power supply. The system includes the switched-mode power supply that provides a first voltage signal and a second voltage signal. The system includes a supervisor circuit that is connected to the first output of the switched-mode power supply and coupled to a relay control circuit. The supervisor circuit monitors the first voltage signal and enables the relay control circuit. The relay control circuit provides a first voltage corresponding to the first voltage signal to a first voltage rail and provides a second voltage corresponding to the second voltage signal to a second voltage rail. A relay powered by a connection to the first voltage rail or the second voltage rail connects the AC power supply to an external load.

18 Claims, 15 Drawing Sheets

(51) Int. Cl.
  *H02H 1/06* (2006.01)
  *H02M 7/06* (2006.01)
  *H02M 7/12* (2006.01)
  *H02H 3/33* (2006.01)

(56) References Cited

U.S. PATENT DOCUMENTS

| | | | | |
|---|---|---|---|---|
| 5,194,858 A | * | 3/1993 | Erwin | H02J 13/00012 |
| | | | | 340/12.11 |
| 5,365,145 A | * | 11/1994 | Fields | H05B 47/29 |
| | | | | 315/86 |
| 5,856,905 A | * | 1/1999 | Eckel | H01H 47/007 |
| | | | | 361/187 |
| 5,984,513 A | * | 11/1999 | Baldwin | H05B 47/14 |
| | | | | 700/286 |
| 6,031,750 A | | 2/2000 | Bruccoleri et al. | |
| 9,812,969 B2 | | 11/2017 | Papismedov et al. | |
| 9,998,025 B1 | * | 6/2018 | Stafford | H02M 7/217 |
| 2011/0248655 A1 | * | 10/2011 | Buchmann | H02M 3/337 |
| | | | | 318/293 |
| 2018/0062524 A1 | | 3/2018 | Papismedov et al. | |

FOREIGN PATENT DOCUMENTS

| | | | | |
|---|---|---|---|---|
| GB | 2319116 A | * | 5/1998 | |
| KR | 101435631 B1 | * | 8/2014 | |
| KR | 102227190 B1 | * | 3/2021 | |

\* cited by examiner

INRUSH CURRENT LIMITING POWER SUPPLY

RELATED APPLICATIONS

This application claims priority to U.S. Provisional Application No. 62/885,408 filed on Aug. 12, 2019, entitled "Neutral-Less Power Supply," the disclosure of which is hereby incorporated by reference in its entirety for all purposes.

TECHNICAL FIELD

The present invention relates generally to a low-power universal input power supply, and more specifically to a low-power power supply suitable for connection to either neutral or earth ground for return that limits inrush current and provides improved operation.

BACKGROUND

Many low-power power supplies, currently installed in the field with the return wire connected to earth ground, are inherently unsafe due to the potential of high inrush current that could significantly exceed safe levels and cause injuries or loss of life. Furthermore, a high rush of current into the power supply (an inrush current) could cause the circuit breaker to trip, if the load is protected with the GFCI (Ground Fault Circuit Interrupt) breaker.

SUMMARY

Aspects and examples are disclosed for systems and processes for enabling one or more voltage rails based on a voltage level of an output from a switched-mode power supply. In an example, the system provides power from an AC power supply to an external load, such as lighting controller equipment. The system includes an AC input circuit, a current limiter circuit, a switched-mode power supply, a supervisor circuit, a relay control circuit, and a relay. The AC input circuit receives an AC signal from an AC power supply. The current limiter circuit may be connected to an output of the AC input circuit and to an input of a switched-mode power supply. The switched-mode power supply provides a first output that is a first voltage signal and provides a second output that is a second voltage signal. A supervisor circuit, connected to the first output of the switched-mode power supply and coupled to a relay control circuit, monitors the first voltage signal. The supervisor circuit can detect when a voltage of the first voltage signal exceeds a threshold voltage. The supervisor circuit provides an output that enables the relay control circuit when the voltage of the first voltage signal exceeds the threshold voltage. Once enabled, the relay control circuit provides the first voltage signal to a first voltage rail and the second voltage signal to a second voltage rail, or both. The relay is connected to the first voltage rail or the second voltage rail and powers an external load by connecting the AC power supply to the external load.

These illustrative aspects and features are mentioned not to limit or define the presently described subject matter, but to provide examples to aid in understanding the concepts described herein. Other aspects, advantages, and features of the presently described subject matter will become apparent after review of the entire application.

BRIEF DESCRIPTION OF THE DRAWINGS

FIG. 2, which includes

FIG. 3, which includes

FIG. 4, which includes

FIG. 5, which includes

DESCRIPTION

During power-on, a power supply can experience an excessive inrush current condition. If the power supply is connected to a sensitive GFCI (Ground Fault Circuit Interrupter) breaker, the inrush current condition may cause the breaker to open, which results in a power disruption to the power supply and to the devices or systems connected to the power supply. In another example, if the power supply is connected to a less sensitive GFCI breaker, the breaker may not open. If the breaker does not open, then a person working on the system may experience a mild electric shock, which may startle the person and cause the person to lose their balance. In other configurations, input power disruptions (power quality) can cause circuit switchers to latch up during unstable or brownout circuit conditions. Applying a maximum load on the low voltage output may cause a circuit switcher to latch up during a power-up of the circuit. Generally, inrush current in Switched-mode Power Supplies (SMPS) presents significant challenges with control for multivolt applications (e.g., 120V-277V). This is due to the inrush current being dependent on the input voltage in the discrete current/inrush limiting components (e.g., resistor or fuse).

One way to address the inrush current issue is to include a current limiter circuit in the power supply. A disadvantage to using a current limiter circuit is that if there is a dip in input voltage, a load connected to the power supply may require more power than the power supply can provide and cause a switcher in the power supply to lock up and enter a fault state that is detrimental to the external load. For example, power supply topologies based on integrated circuit switchers that do not include an integrated brownout detection capability are prone to locking up. To address the lock up issue, the power supply may include a low voltage control circuit that connects the low voltage load when the voltage output by the power supply is above a threshold and that disconnects the low voltage load (e.g., microcontroller, relay control circuit, etc.) when the voltage output is below the threshold. The system and methods disclosed herein regulate the connection of the load by regulating the voltage rails such that dips in input voltage do not cause a fault state of the integrated circuit switchers in the switched-mode power supply.

Figure 1:
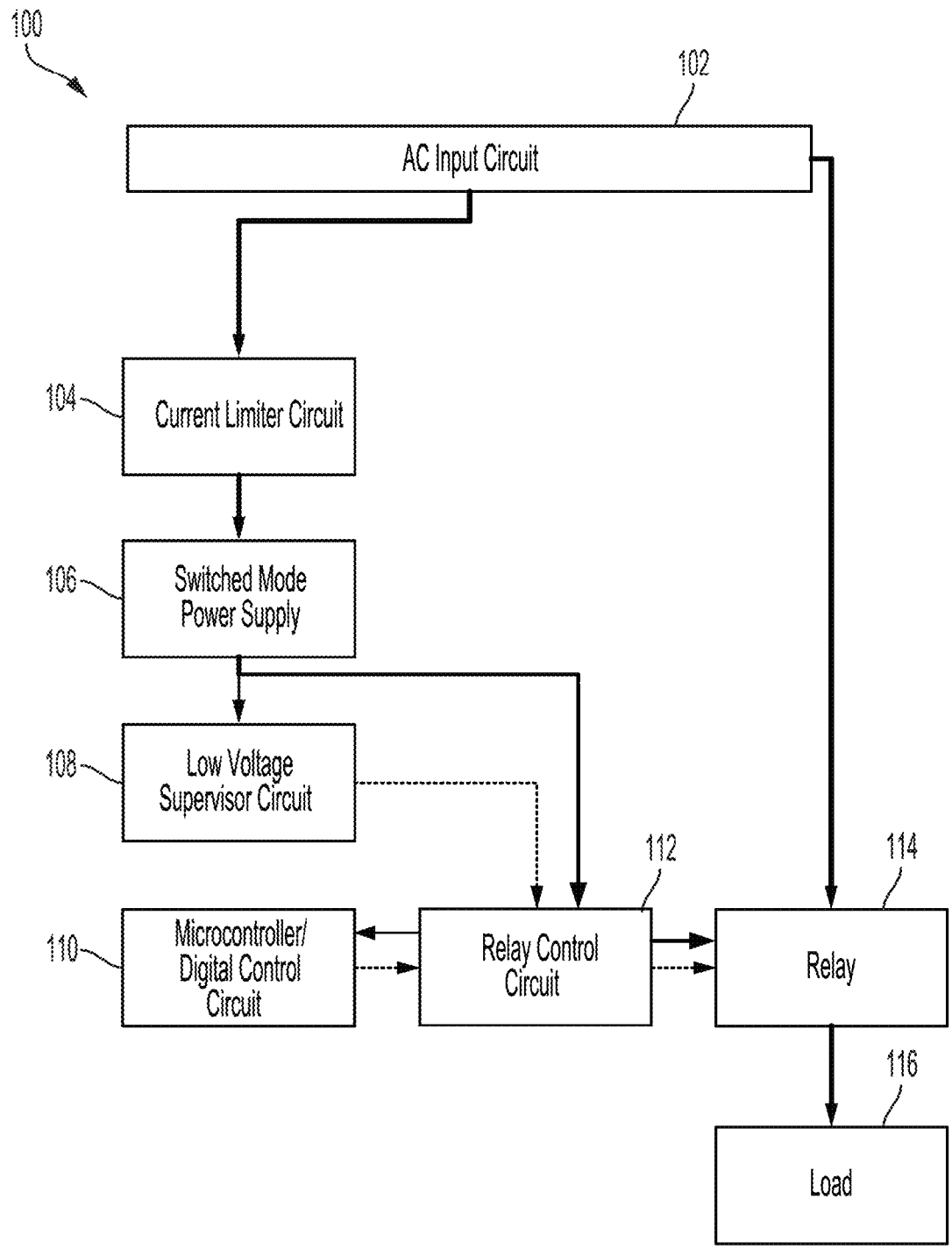
FIG. 1 depicts a block diagram of an exemplary low-power universal input power supply, according to aspects of the present disclosure.

Turning now to the Figures, FIG. 1 depicts a block diagram of an exemplary system that includes a low-power universal input power supply, according to aspects of the present disclosure. The system receives alternating current (AC) power via an AC input circuit 102. The power supply may be a universal input power supply that is operable across a wide range of AC input voltages, e.g., 120-480 VAC, and across multiple frequencies, e.g., 50-60 Hz.

The AC input circuit 102 may include a rectifier, various resistors, or other components and may be connected to a current limiter circuit 104. The current limiter circuit 104 limits the current to an appropriate current level, regardless of the output of the AC input circuit 102. The current limiter circuit 104 provides a limited or controlled output AC current to a switched-mode power supply 106. In some examples, the switched-mode power supply 106 can include a flyback converter circuit or a buck converter circuit. The output of the switched-mode power supply 106 is connected to the low voltage supervisor circuit 108 and to a relay control circuit 112. In some examples, the switched-mode power supply 106 includes additional outputs at the same or different voltages.

The low voltage supervisor circuit 108 monitors a voltage level output from the switched-mode power supply 106 and enables the relay control circuit 112 once the voltage level of the output exceeds a threshold voltage. The low voltage supervisor circuit 108 and the relay control circuit 112 control when the voltage rail(s) of the system are active and when the low voltage load is powered. The low voltage supervisor circuit and the relay control circuit may be referred to collectively herein as a low voltage load control circuit. The low voltage load includes other components of the system, including the microcontroller 110. The microcontroller 110 provides a control signal (e.g., a control output) to the relay control circuit 112 to control the state of the relay 114. The relay 114 controls the connection of power to an external load 116. The dashed lines in FIG. 1 illustrate control signals and the solid lines illustrate voltage or power.

Figure 2A:
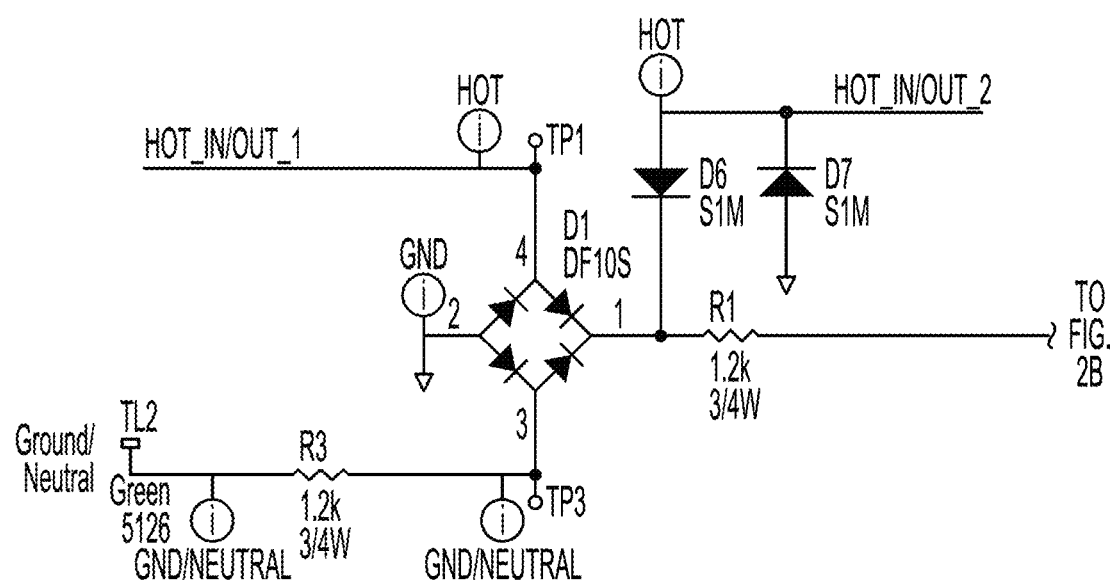
FIGS. 2A, 2B, and 2C, depicts a schematic of an exemplary power supply, according to aspects of the present disclosure.

Additional details of the system are provided in FIG. 2. FIG. 2 depicts a schematic of an exemplary system including an AC input circuit, a current limiter, a power supply, a supervisor circuit, a relay control circuit, and a relay. FIG. 2A illustrates the AC input circuit. The circuit may be connected to a neutral or earth ground return. When the load is a lighting controller, the neutral return may be appropriate for an installation in new construction and the earth ground return may be appropriate for a retrofit installation.

Figure 2B:
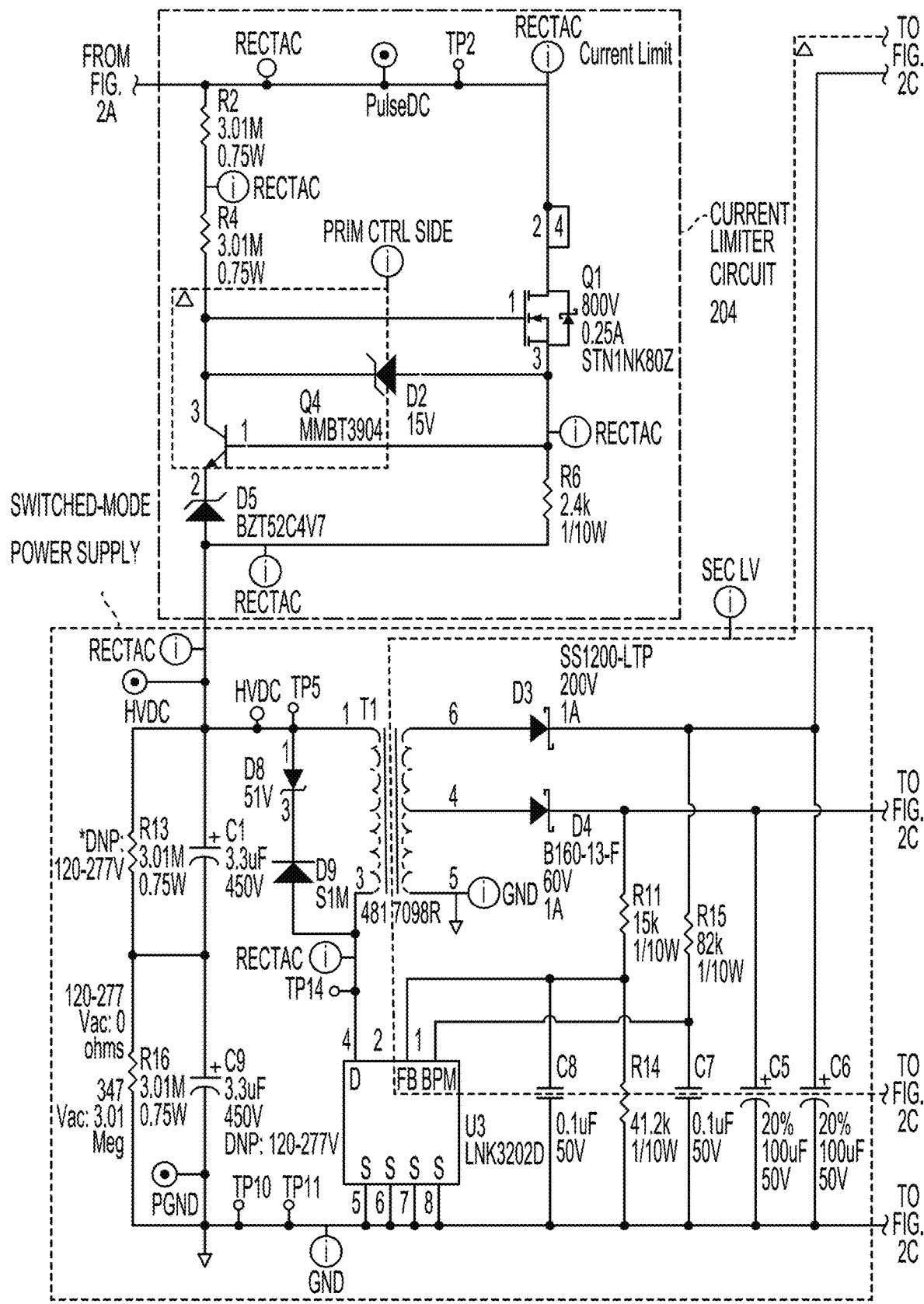

FIG. 2B illustrates the current limiter circuit and the SMPS. The current limiter circuit 204 includes a transistor Q1 (e.g., a MOSFET), diodes D2, D5, and resistors R2, R4, R6. The transistor Q1 is selected to have a rating that exceeds the full input voltage range (e.g., the maximum voltage from the AC input circuit 102) by an additional tolerance. In one implementation, where the maximum input voltage is 480 VAC, the transistor Q1 is rated for 80V. The output of the current limiter circuit 104 is programmable or configurable and may be set by the selection of diode D5 and resistor R6. In one implementation, the output of the current limiter circuit 104 is limited to 2 mA. In some implementations, D5 and Q4 have opposite temperature coefficients, e.g., D5 has a positive temperature coefficient while Q4 has a negative temperature coefficient, which helps the power supply operate over a wide range of temperatures. The output of the current limiter circuit 104 may be programmed to be limited to a value, e.g., 2 mA, which is inherently safe for any person. The UL 773A standard specifies that the steady state leakage current cannot exceed 500 µA, but does not provide a current inrush limit.

Figure 4A:
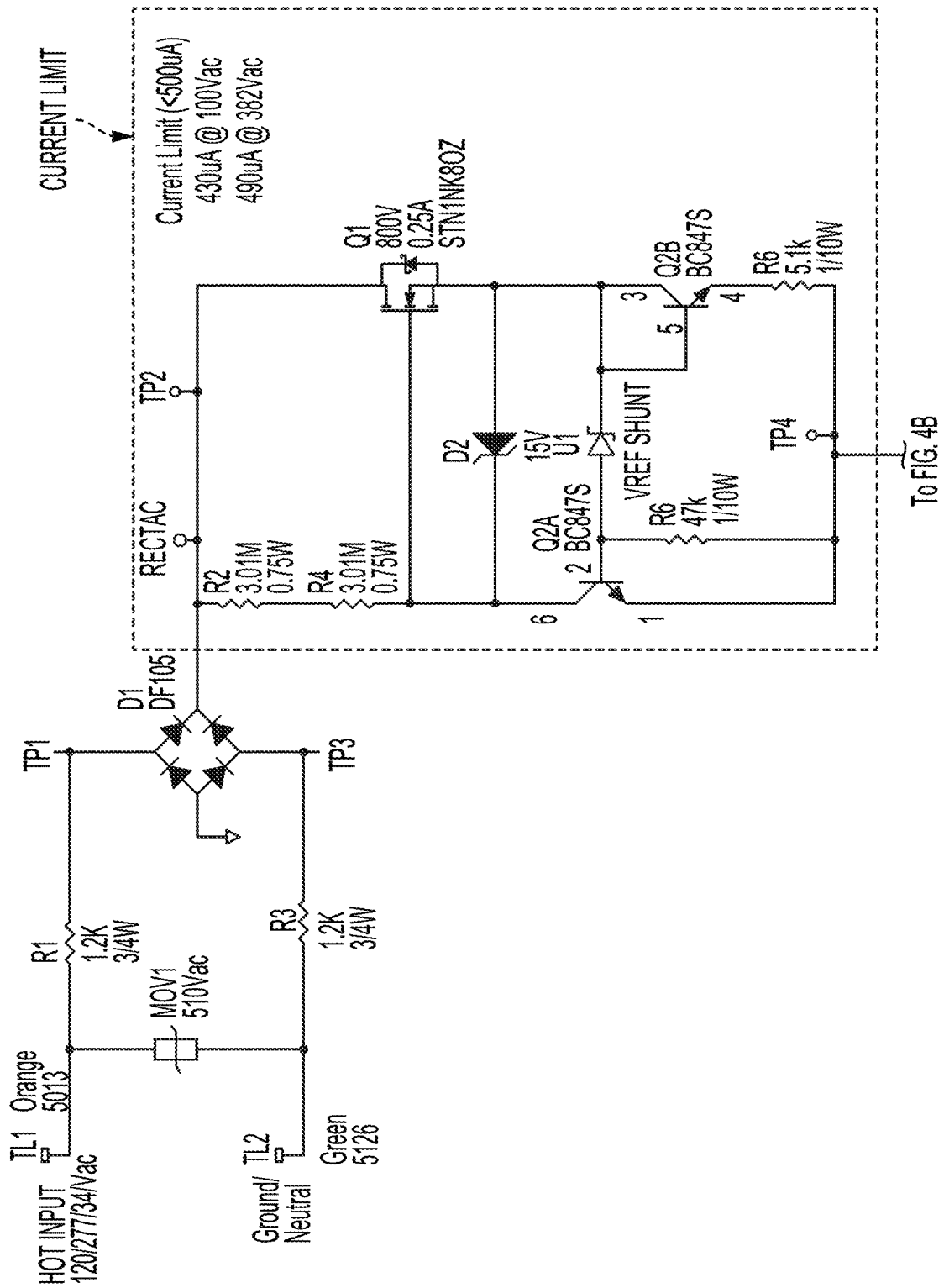
FIGS. 4A, 4B, and 4C, illustrates another power supply design where the load control circuit uses a time delay, according to aspects of the present disclosure.
Figure 5A:
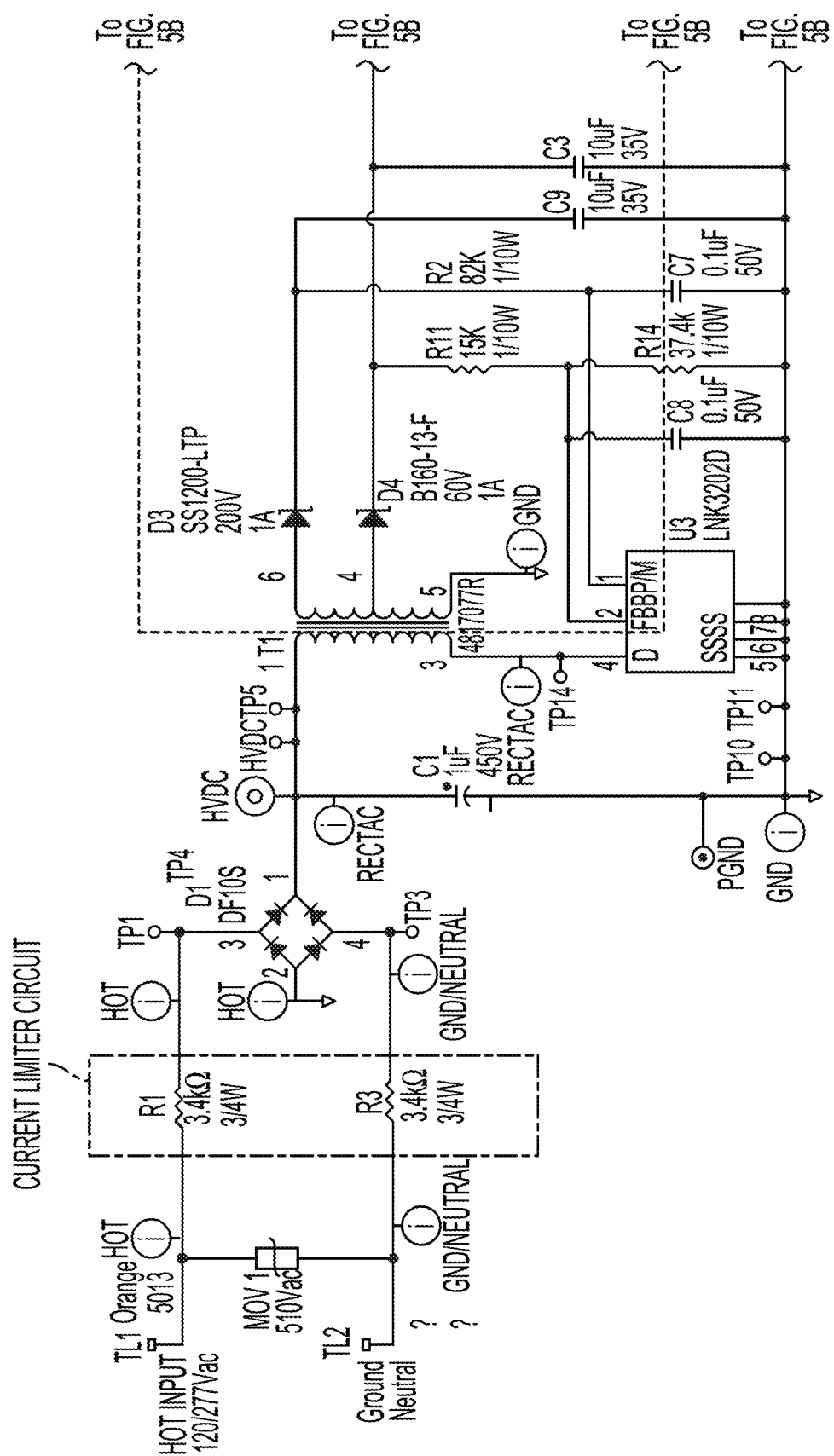
FIGS. 5A and 5B, illustrates an alternative current limiter circuit that uses resistors, according to aspects of the present disclosure.

Other current limiter circuit 104 topologies are also possible. For example, an NPN/PNP transistor may be used in place of MOSFET Q1 in FIG. 2B. Other alternatives are illustrated in FIG. 4A and FIG. 5A.

The switched-mode power supply shown in FIG. 2B includes input capacitors C1, C9, diodes D8, D9, resistors R13, R16, and switcher U3. Diodes D8 and D9 act as a snubber and are included to handle the flyback voltage created when the switcher U3 is in an off position. Resistors R13 and R16 act as a voltage divider and ensure that the voltage across the filter electrolytic capacitors are balanced. In some embodiments, the voltage divider is included for configurations with the capacitors connected in series. In one implementation, the switcher operates nominally at 66 kHz. The switched-mode power supply provides one or more output voltages. FIG. 2B illustrates a first output voltage of approximately 3.5 V that is provided to the supervisor circuit in FIG. 2C and a second output voltage of approximately 12V that is provided to the relay in FIG. 2C. Other switched-mode power supply circuit topologies are also possible, including, but not limited to, a buck topology.

The power supply may be an isolated or non-isolated design. FIG. 2B depicts a non-isolated design that uses an additional winding in transformer T1. In other examples, isolation could be achieved by including an additional transformer between the AC input circuit and the current limiter circuit or an additional transformer between the switched-mode power supply and the supervisor circuit.

Figure 2C:
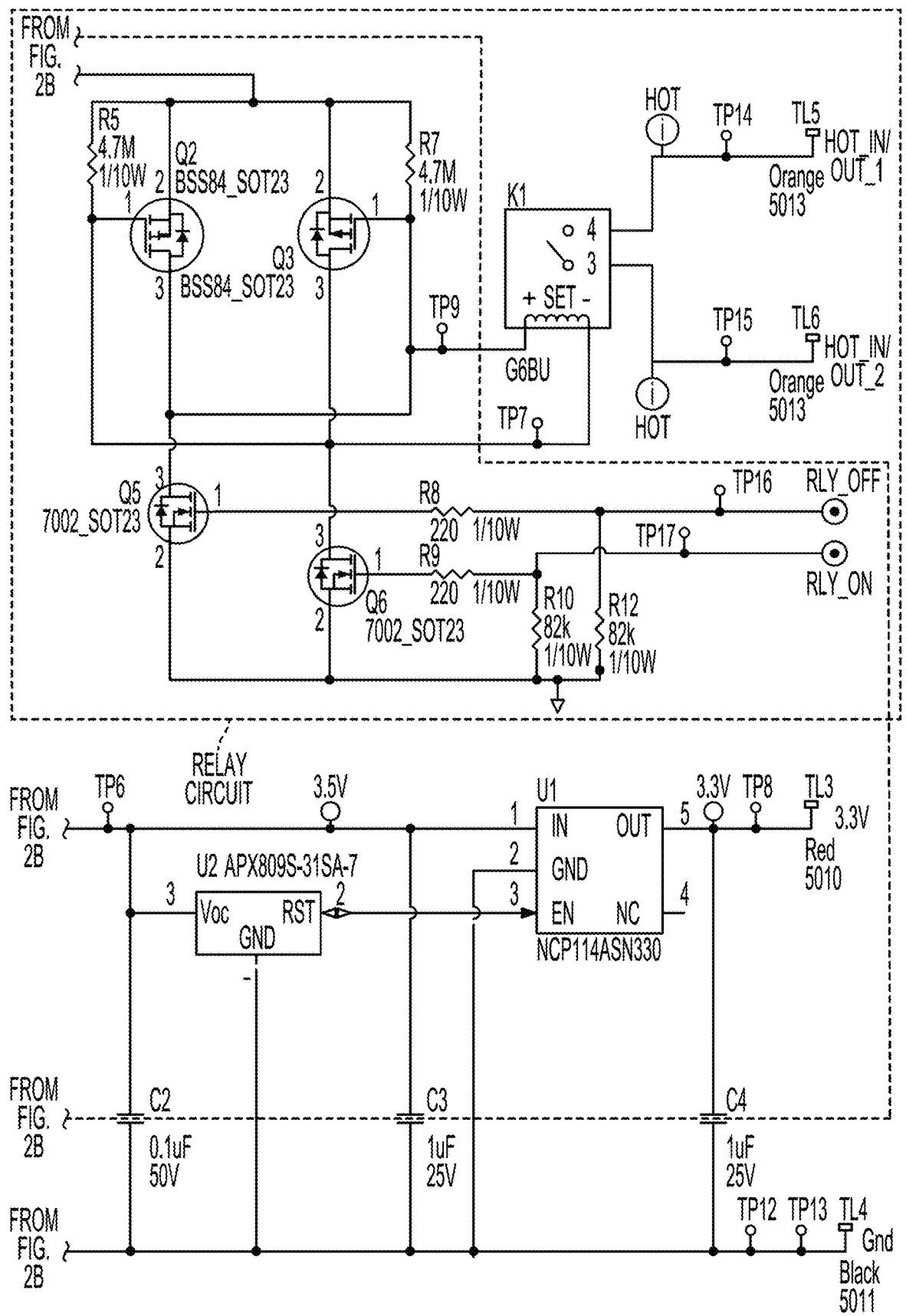

FIG. 2C illustrates a low voltage load control circuit that includes a supervisor circuit and a relay control circuit. The supervisor circuit includes voltage detector U2 and the relay control circuit includes linear regulator U1. In one implementation, the linear regulator is an LDO (Low Drop Out) regulator circuit. The supervisor circuit controls the linear regulator by controlling an enable pin on the regulator. The supervisor circuit monitors the output voltage of the switched-mode power supply. At power-up, the supervisor circuit sends a signal to the relay control circuit to disable the relay control circuit. So long as the output voltage from the switched-mode power supply is below a threshold voltage, the supervisor circuit continues to disable the regulator relay control circuit. While the relay control circuit is disabled, the voltage rail controlled by the relay control circuit is held low. Once the output voltage is above the threshold voltage, the supervisor circuit enables the relay control circuit, which causes the relay control circuit to provide the output voltage to the voltage rail. The threshold voltage may be predefined or programmable. In one implementation, the threshold voltage is approximately 3.08 V. Once the supervisor circuit detects that the output voltage exceeds 3.08 V, the supervisor circuit enables the relay control circuit. The relay control circuit then connects the output voltage to the voltage rail. At this point, the other components of the system that receive power via the voltage rail, e.g., the microcontroller (not shown), are powered. The microcontroller may be considered part of the relay control circuit since it outputs control signals, RLY_OFF, RLY_ON, which control the relay coil of relay 114.

If the output voltage from the switched-mode power supply falls below the threshold voltage, the supervisor circuit disables the relay control circuit, which in turn disconnects the output voltage from the voltage rail.

In some examples, the system can include an optional relay as depicted in FIG. 2C. The relay controls AC power to the external load. The control circuit for the relay coil (i.e., the circuit controlling the state of the relay contacts) can include an H-bridge.

FIG. 3 illustrates a schematic of an exemplary system where the supervisor circuit and the relay control circuit control multiple voltage rails. FIG. 3A illustrates an AC input circuit, FIG. 3B illustrates a current limiting circuit, FIG. 3D illustrates a zero-cross detection circuits, FIG. 3E illustrates a power supply, FIG. 3F illustrates a supervisor circuit and a relay control circuit, and FIG. 3C illustrates a relay. In FIG. 3D, the zero-cross detection circuits provide line voltage zero-cross information to the microcontroller from both sides of relay contacts. The microcontroller uses this zero-cross information to calculate when to actuate the relay so that contacts are closed approximately at the voltage zero cross. The zero-cross information is also used to confirm the relay state as closed or open. In FIG. 3F, the relay control circuit includes additional components other than those shown in FIG. 2C to control a second voltage rail. These additional components may provide additional voltage control. The voltage control circuit in FIG. 3F includes Q6, Q7.

Figure 3A:
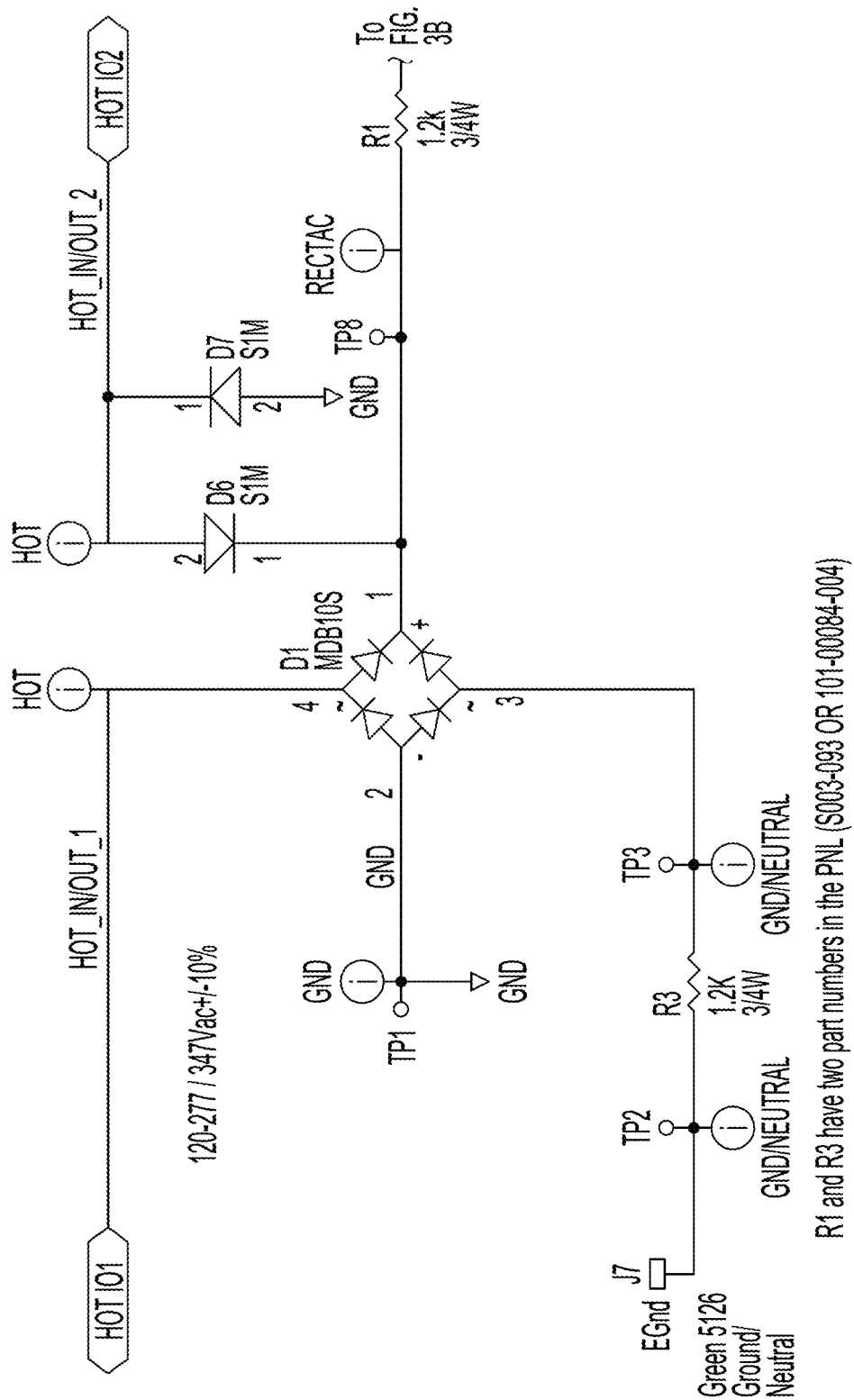
FIGS. 3A, 3B, 3C, 3D, 3E, and 3F, illustrates a schematic of an exemplary power supply with multiple voltage rails, according to aspects of the present disclosure.
Figure 3B:
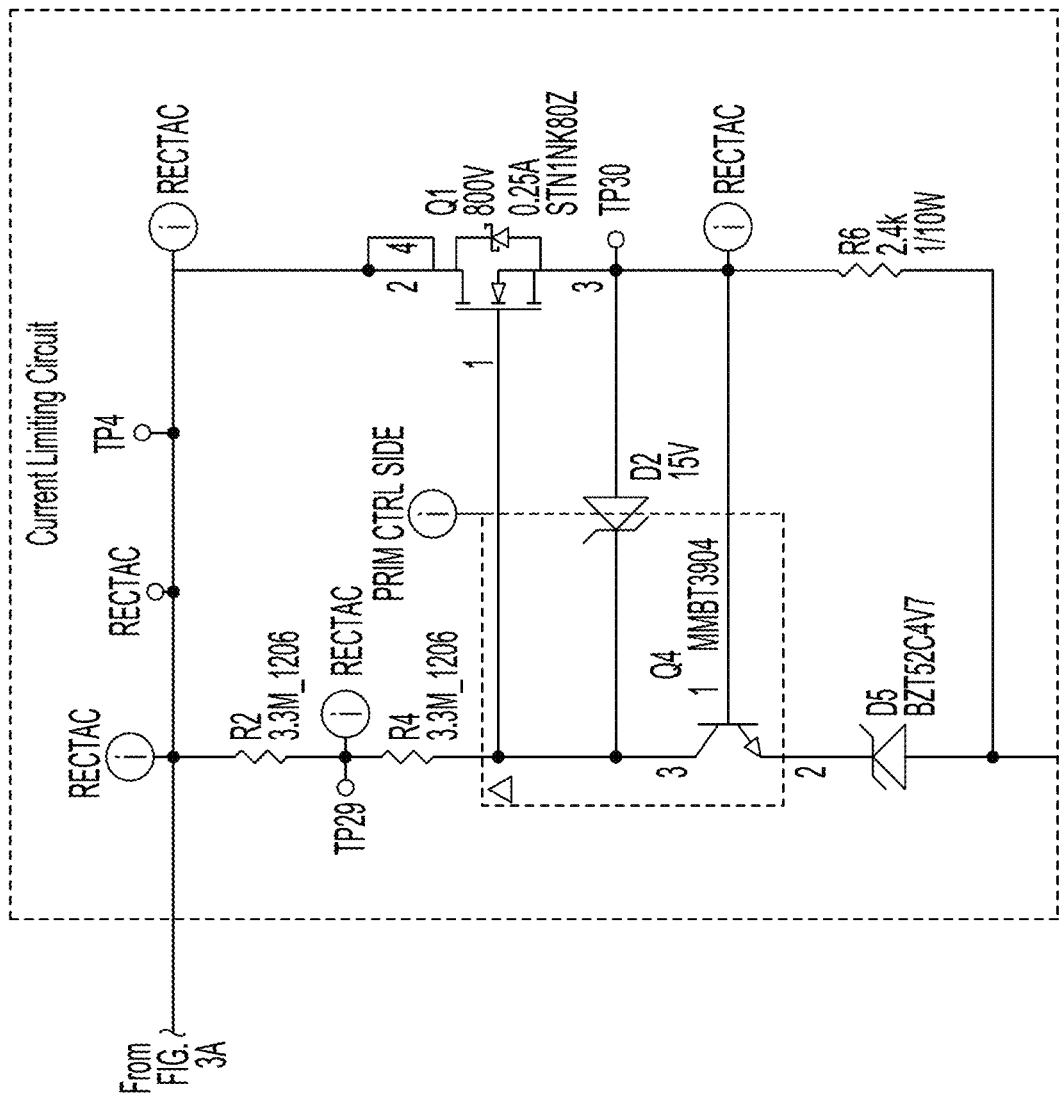
Figure 3C:
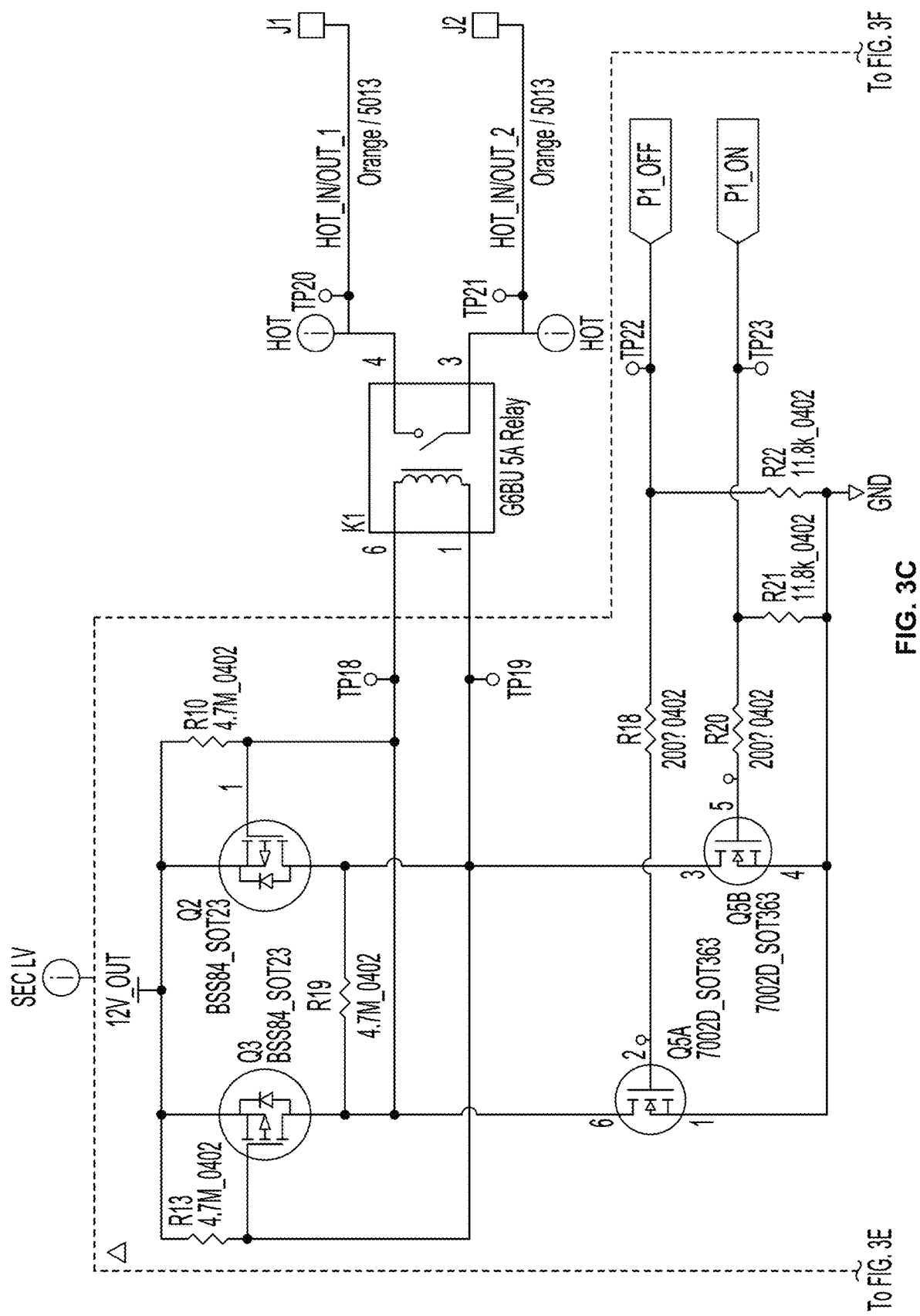
Figure 3D:
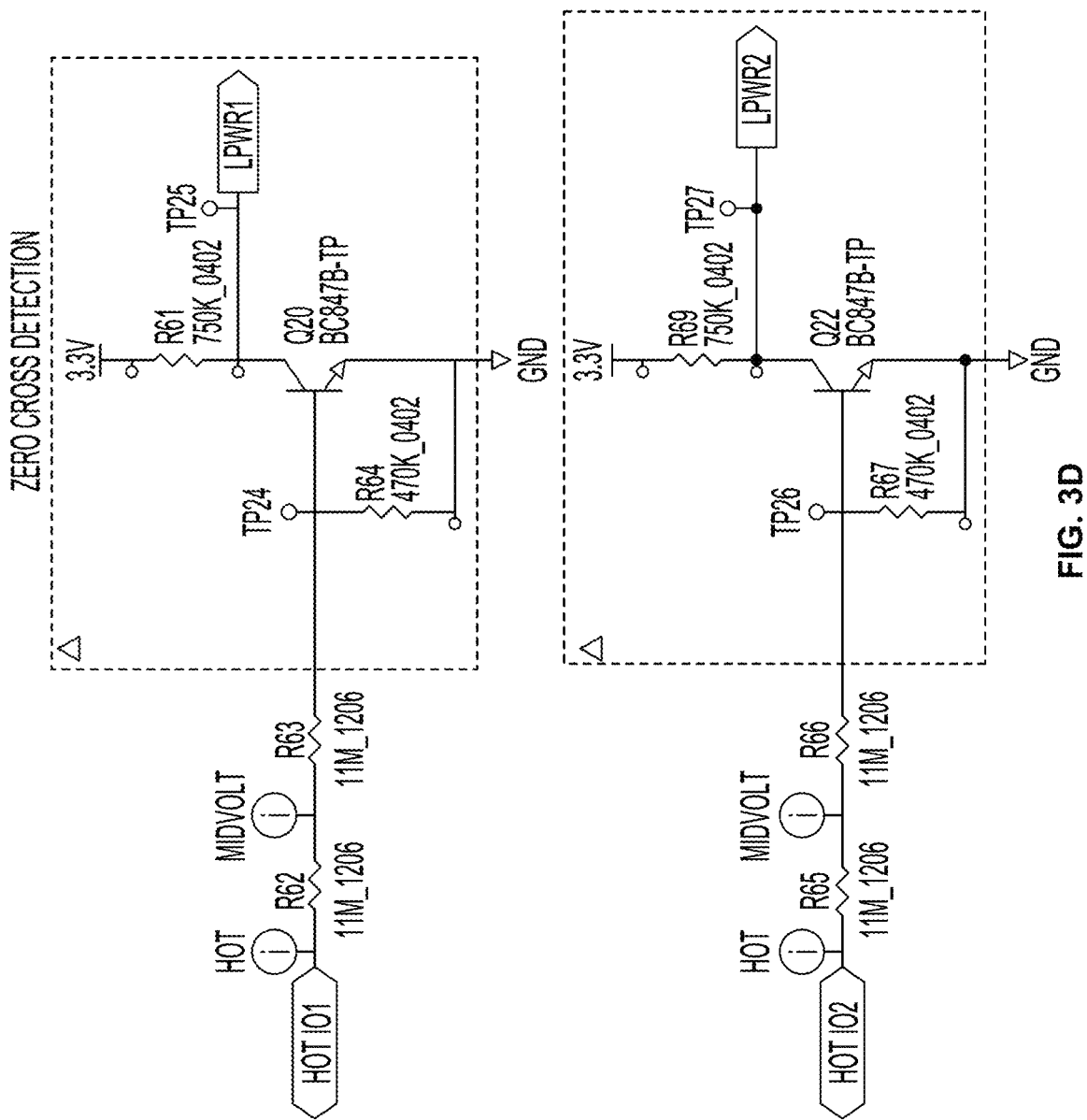
Figure 3E:
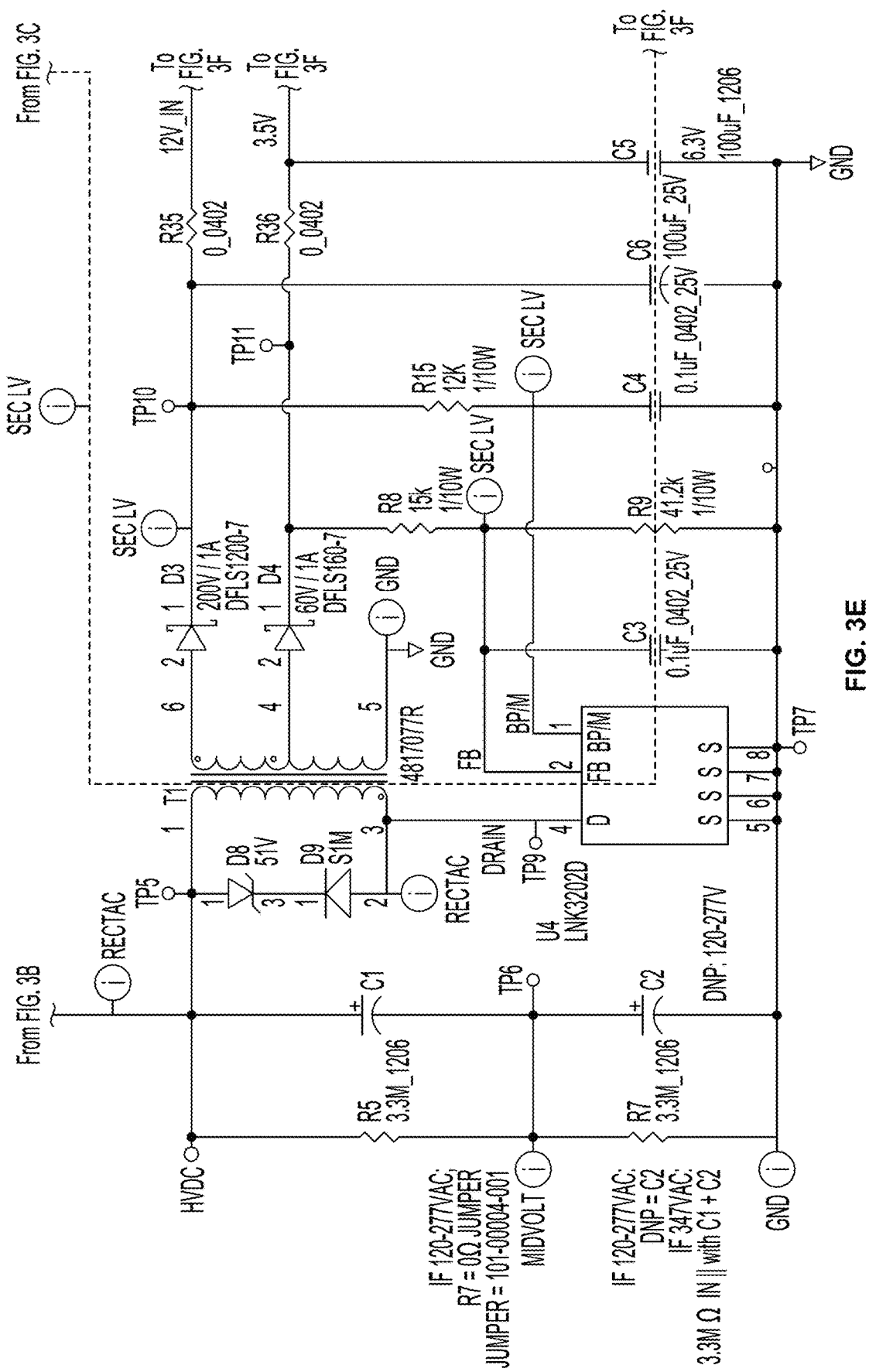

In FIG. 3, the power supply outputs a first voltage signal of approximately 3.5V (e.g., 3.5V at the output of R36 in FIG. 3E) and a second voltage output signal of approximately 12V (e.g., 12V at the output of R35 in FIG. 3E). The supervisor circuit monitors the voltage of the first voltage signal to detect when the output of the switched-mode power supply exceeds a voltage threshold. So long as the voltage of the output of the switched-mode power supply is less than the threshold voltage, the supervisor circuit disables the relay control circuit by controlling an output of the voltage detector U5. The output of the voltage detector is connected to the enable input of the linear regulator U6 and to the gate of Q6. While the relay control circuit is disabled, the linear regulator disables the 3.3V voltage rail by holding the 3.3V voltage rail low and the voltage control circuit disables the 12V voltage rail by holding the 12V voltage rail low. In the voltage control circuit, Q6 turns Q7 off, which holds the 12V voltage rail low.

Figure 3F:
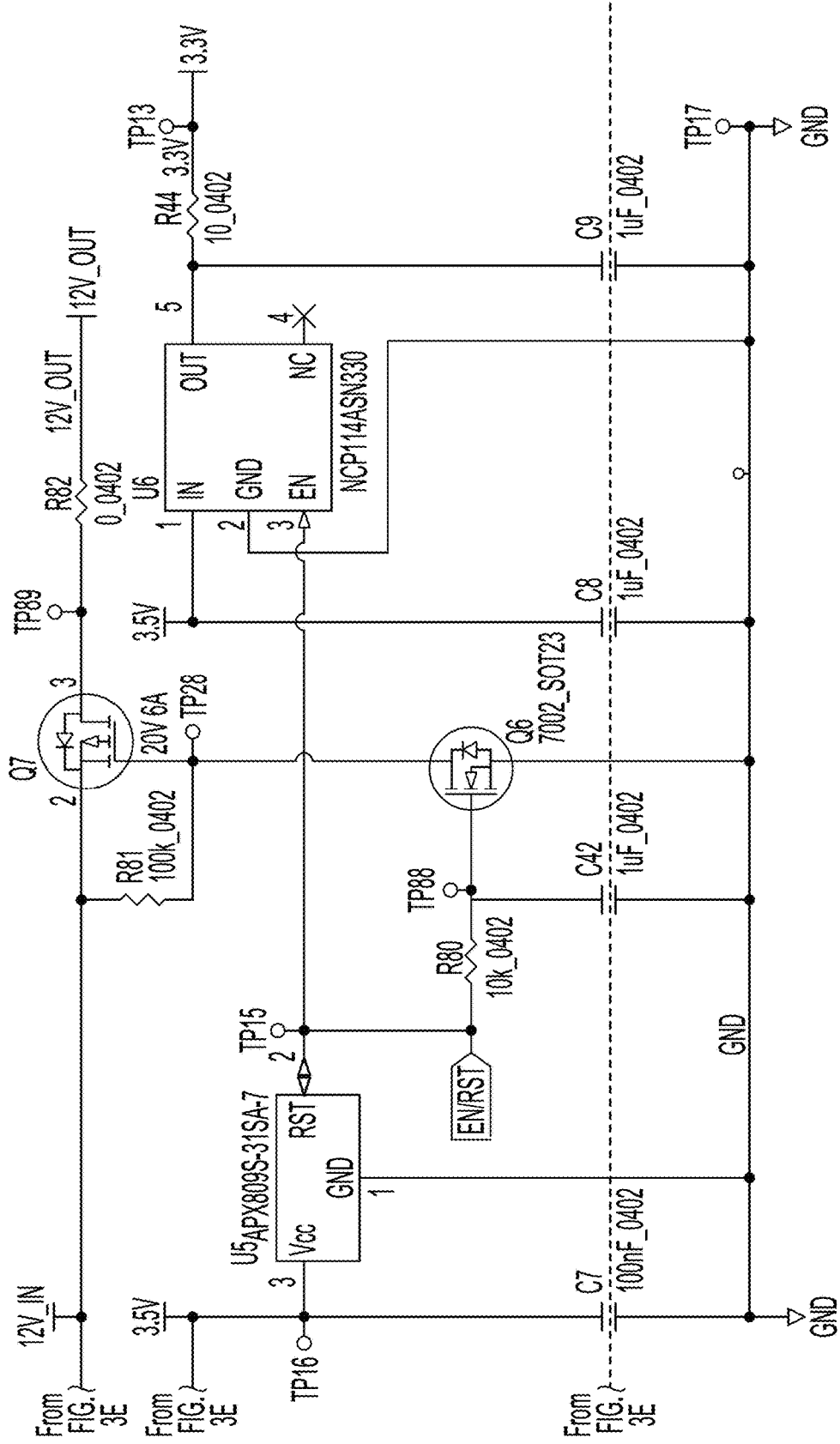

Once the supervisor circuit detects that the first voltage signal exceeds the threshold voltage, the supervisor circuit enables the relay control circuit. While the relay control circuit is enabled, the linear regulator provides the first voltage signal to the first voltage rail and Q6 allows Q7 to turn on to provide the second voltage signal to the second voltage rail. In FIG. 3F, there may be a delay of approximately 5-10 ms between powering the first voltage rail and the second voltage rail. Although a delay may be preferred for some implementations, the amount of the delay may vary. The other components of the system that receive power via the voltage rails are powered once the voltage rails are powered. For example, the microcontroller (not shown) is powered via the first voltage rail and the relay is powered by the second voltage rail. Once powered, the operation of the relay is controlled by the microcontroller via P1_OFF and P1_ON.

Figure 4B:
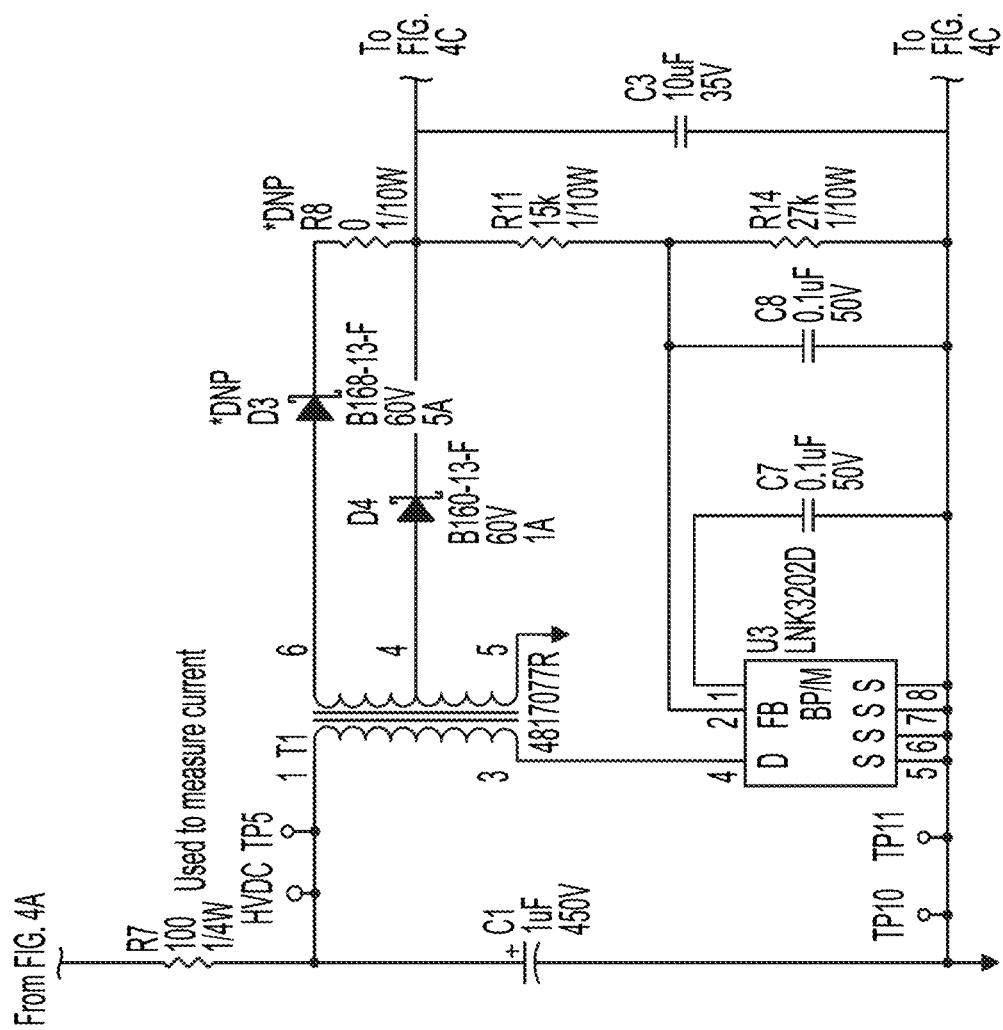
Figure 4C:
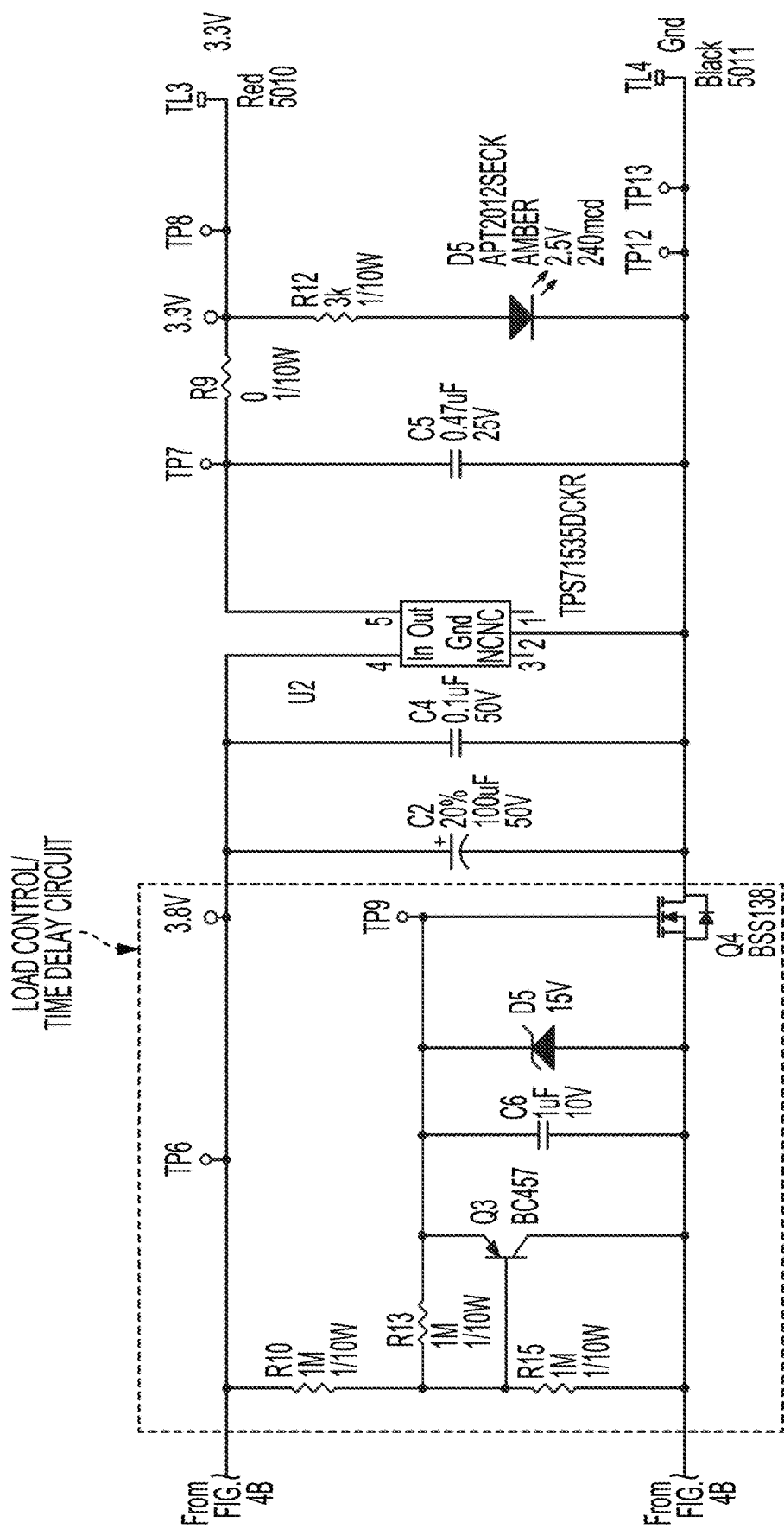

FIG. 4 illustrates another design where the low voltage load control circuit uses a time delay circuit instead of a supervisor circuit and a linear regulator. FIG. 4A illustrates an AC input circuit and a current limiter circuit. FIG. 4B illustrates a switched-mode power supply. FIG. 4C illustrates a load control circuit with a time delay circuit.

In FIG. 4C, the time delay circuit includes resistors R10, R13, R15, capacitor C6, diode D5, transistor Q3, and transistor Q4. At power-up, the time delay circuit delays the connection of the low power load to allow time for the input bulk capacitor C1 in FIG. 4B to charge. The time delay circuit controls the return path for the linear regulator (TPS71533DCKR). The linear regulator is off until Q4 (BSS138) in the time delay circuit turns ON. This stabilizes the switched-mode power supply and helps reduce inrush current prior to connection of the low power load. This also helps prevent the switcher from locking up as it ensures that the power supply is allowed to stabilize prior to connection of the load.

The time delay may be a configurable length of time (e.g., corresponding to the average time for the power supply to achieve steady state during power-up) that is determined by the selection of the components. In one example, the time delay is regulated by a time constant of R10, R13 and C6. The Q4 MOSFET (BSS138) turns ON after the voltage on the gate (pin 1) is above its minimum turn-on threshold voltage, which may be 1.3V. Accordingly, the voltage across C6 (1 uF) capacitor controls the gate voltage. The voltage across C6 increases slowly when the power supply is turned ON, and this time constant is determined by resistance values of (R10, R13), capacitor value of C6 (1 uF), and turn ON voltage of Q4. In the illustrated example, the time delay is 0.73 s because R15 pull-down resistor impacts the time constant. Other configurations for other time delays are possible.

If the voltage output of the switched-mode power supply falls below a voltage threshold, then the load control circuit disconnects the load. After the voltage level returns to a level that exceeds the threshold a time interval corresponding to the time delay has passed, the load control circuit reconnects the load.

Figure 5B:
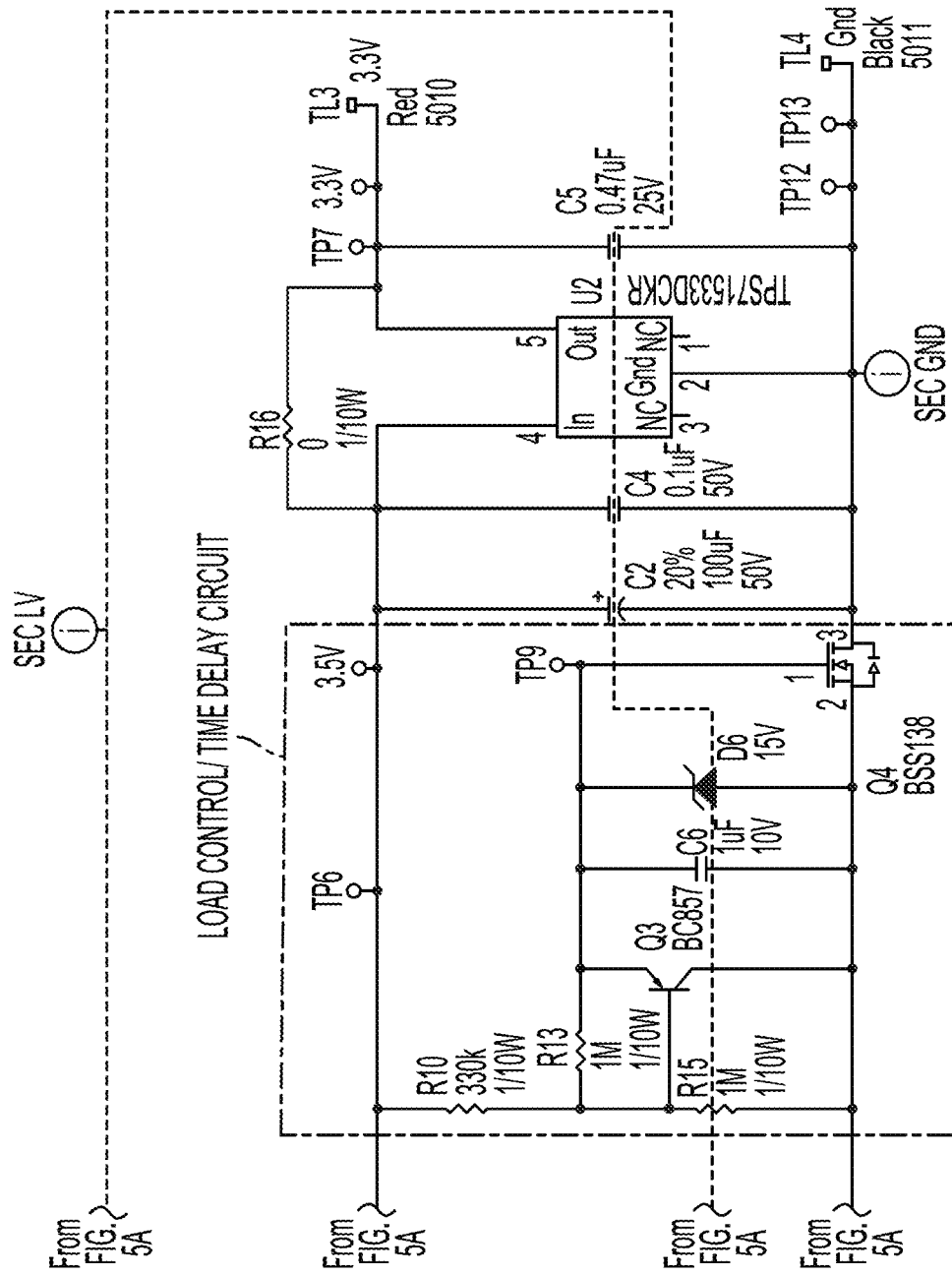

FIG. 5A illustrates an alternative current limiter circuit that uses resistors, according to aspects of the present disclosure. For example, resistors R1 and R3 limit the current. FIG. 5B illustrates a time delay example of the load control circuit. FIG. 5 includes components similar to those described with regard to FIG. 4. For instance, in FIG. 4A, the resistors R1 and R3 (1.2$k$ ohms) improve surge immunity of the device. In FIG. 5A, the resistors R1 and R3 (3.4$k$ ohms) provide surge immunity and current limiting.

Power supplies, which include a switched-mode power supply, current limiter circuit, and load control circuit (e.g., supervisor circuit, and relay control circuit), such as those described herein may be connected in parallel with respect to each other and in series with a GFCI protected circuit. In one implementation, a group of up to four power supplies may be connected in parallel with each other and the group of power supplies may be connected in series with a circuit with a sensitive GFCI breaker. The current limiter circuit limits the inrush current so that the GFCI breaker does not trip during power-up due to excessive inrush current and the load control device controls the load so that the switcher does not lock up when the output voltage of the switched-mode power supply is below the voltage threshold.

In some examples, the power supply can be powered from either side of the load control circuit (e.g., from the AC power source and relay input side, or the relay output side). In such a configuration, as illustrated by FIGS. 2A and 2C, the improvements to safety are significant because it prevents miswiring the circuitry because both sides are connected to the high voltage circuitry (e.g., HOT_IN/OUT1 and HOT_IN/OUT2 of the relay) and accordingly, input and output wires have the same colors (e.g., removing an installer's concern about wire color codes).

Although the foregoing describes exemplary implementations, other implementations are possible. It will be appreciated that those skilled in the art, upon attaining an understanding of the foregoing, may readily produce alterations to, variations of, and equivalents to, the described aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system comprising:
an alternating current (AC) input circuit, wherein an input of the AC input circuit is configured to connect to an AC power supply;
a current limiter circuit, wherein an input of the current limiter circuit is connected to an output of the AC input circuit, and wherein an output of the current limiter circuit is connected to an input of a switched-mode power supply;
the switched-mode power supply, wherein the switched-mode power supply comprises a first output configured to provide a first voltage signal, and a second output configured to provide a second voltage signal;
a supervisor circuit connected to the first output of the switched-mode power supply and coupled to a relay control circuit, wherein the supervisor circuit is configured to monitor the first voltage signal and, in response to detecting that a voltage of the first voltage signal exceeds a threshold voltage, enable the relay control circuit;
the relay control circuit, wherein the relay control circuit is connected to the first output of the switched-mode power supply and is configured to provide, responsive to being enabled by the supervisor circuit, a first voltage corresponding to the first voltage signal to a first voltage rail and a second voltage corresponding to the second voltage signal to a second voltage rail; and
a relay configured to be powered by a connection to the first voltage rail or the second voltage rail, wherein the relay is further configured to connect the AC power supply to an external load.

2. The system of claim 1, wherein the relay control circuit is configured to provide the first voltage signal to the first voltage rail at a first time and configured to provide the second voltage signal to the second voltage rail at a second time that is after the first time.

3. The system of claim 1, wherein the supervisor circuit is configured to disable the relay control circuit until the supervisor circuit detects that the voltage of the first voltage signal exceeds the threshold voltage, and wherein the relay control circuit is configured to disable the first voltage rail and the second voltage rail while the relay control circuit is disabled.

4. The system of claim 1, wherein the relay control circuit includes a linear regulator, and wherein a voltage input of the linear regulator is connected to the first voltage signal, an enable input is connected to an output of the supervisor circuit, and an output of the linear regulator is connected to the first voltage rail.

5. The system of claim 1, wherein the relay control circuit includes a voltage control circuit, and wherein a voltage input of the voltage control circuit is connected to the second voltage signal, an enable input is connected to an output of the supervisor circuit, and an output of the voltage control circuit is connected to the second voltage rail.

6. The system of claim 5, wherein the voltage control circuit includes a first transistor connected and a second transistor, wherein the enable input is coupled to the first transistor and the first transistor is configured to control the second transistor to couple the second voltage signal to the second voltage rail when the voltage control circuit is enabled.

7. The system of claim 1, wherein the switched-mode power supply includes a flyback converter or a buck converter.

8. The system of claim 1, wherein the relay control circuit includes a microcontroller configured to be powered by a connection to the first voltage rail, wherein the microcontroller is configured to provide at least one control output for controlling the relay to control connection of the AC power supply to the external load.

9. The system of claim 1, wherein the first voltage signal is a 3.5V signal and the second voltage signal is greater than 3.5V.

10. A system comprising:
an alternating current (AC) input circuit, wherein an input of the AC input circuit is configured to connect to an AC power supply;
a current limiter circuit, wherein an input of the current limiter circuit is connected to an output of the AC input circuit, and wherein an output of the current limiter circuit is connected to an input of a switched-mode power supply;
the switched-mode power supply, wherein an output is configured to provide a voltage signal;
a supervisor circuit connected to the output of the switched-mode power supply and coupled to a relay control circuit; wherein the supervisor circuit is configured to monitor the voltage signal, and to provide an output that enables the relay control circuit responsive to detecting a voltage of the voltage signal exceeding a threshold voltage;
the relay control circuit, wherein the relay control circuit is connected to the output of the switched-mode power supply and is configured, in response to being enabled by the supervisor circuit, to provide the voltage signal to a voltage rail; and
a relay configured to be powered by a connection to the voltage rail, wherein the relay is further configured to connect the AC power supply to an external load.

11. The system of claim 10, wherein the supervisor circuit is configured to disable the relay control circuit until the supervisor circuit detects that the voltage of the voltage signal exceeds the threshold voltage, and wherein the relay control circuit is configured to disable the voltage rail while the relay control circuit is disabled.

12. The system of claim 10, wherein the relay control circuit includes a linear regulator, and wherein a voltage input of the linear regulator is connected to the voltage signal, an enable input is connected to an output of the supervisor circuit, and an output of the linear regulator is connected to the voltage rail.

13. The system of claim 10, wherein the switched-mode power supply includes a flyback converter or a buck converter.

14. A method of providing power from an AC power supply to an external load, the method comprising:
receiving, by an alternating current (AC) input circuit, an AC signal from an AC power supply;
limiting, by a current limiter circuit connected to an output of the AC input circuit, an output that is connected to an input of a switched-mode power supply, the switched-mode power supply further comprising a first output and a second output;

providing, by the switched-mode power supply, a first voltage signal from the first output and a second voltage signal from the second output;

monitoring, by a supervisor circuit connected to the first output of the switched-mode power supply and coupled to a relay control circuit, the first voltage signal;

detecting, by the supervisor circuit, a voltage of the first voltage signal exceeding a threshold voltage;

providing, by the supervisor circuit, an output that enables the relay control circuit;

providing, by the relay control circuit connected to the first output of the switched-mode power supply, the first voltage signal to a first voltage rail and the second voltage signal to a second voltage rail; and connecting, with a relay powered by a connection to the first voltage rail or the second voltage rail, the AC power supply to the external load.

15. The method of claim 14, wherein providing, by the relay control circuit, the first voltage signal to a first voltage rail and the second voltage signal to a second voltage rail comprises:

providing the first voltage signal to the first voltage rail at a first time; and providing the second voltage signal to the second voltage rail at a second time that is after the first time.

16. The method of claim 14, further comprising enabling the relay via a control signal from a microcontroller powered by the first voltage rail, wherein enabling the relay connects the AC power supply to the external load.

17. The method of claim 14, further comprising:

detecting, by the supervisor circuit, a voltage of the first voltage signal below the threshold voltage; and disabling, by the supervisor circuit, the relay control circuit.

18. The method of claim 14, wherein providing, by the relay control circuit, the first voltage signal to a first voltage rail and the second voltage signal to a second voltage rail comprises providing a voltage signal of less than 12V to the first voltage rail and providing a 12V signal to the second voltage rail.

\* \* \* \* \*